(12) United States Patent
Buck, Jr.

(10) Patent No.: US 12,052,351 B1
(45) Date of Patent: Jul. 30, 2024

(54) SYSTEMS AND METHODS FOR SCALING QUANTUM KEY TRANSMISSION TO ENHANCE SECURITY

(71) Applicant: LOCKHEED MARTIN CORPORATION, Bethesda, MD (US)

(72) Inventor: Joseph Robert Buck, Jr., Superior, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 246 days.

(21) Appl. No.: 17/836,916

(22) Filed: Jun. 9, 2022

(51) Int. Cl.
H04L 9/08 (2006.01)

(52) U.S. Cl.
CPC .......... *H04L 9/0852* (2013.01); *H04L 9/0819* (2013.01)

(58) Field of Classification Search
CPC ............................ H04L 9/0852; H04L 9/0819
See application file for complete search history.

(56) References Cited

U.S. PATENT DOCUMENTS

| | | | |
|---|---|---|---|
| 8,755,525 B2 * | 6/2014 | Wiseman | H04L 9/0852 380/278 |
| 10,291,399 B2 * | 5/2019 | Nordholt | H04L 9/0852 |
| 2006/0210083 A1 * | 9/2006 | Takemoto | B82Y 10/00 380/278 |
| 2017/0222803 A1 * | 8/2017 | Tanizawa | H04L 63/0853 |
| 2018/0062836 A1 * | 3/2018 | Tanizawa | H04L 9/0852 |

* cited by examiner

*Primary Examiner* — Baotran N To
(74) *Attorney, Agent, or Firm* — BAKERHOSTETLER

(57) ABSTRACT

Information can be transmitted through classical and quantum communication channels in parallel and at rates that enhance secure communication. The quantum communication is scaled to a transmission rate of 10 GHz or more, which matches the rate of classical communication transmission. During transmission of information (e.g., a message) through a classical channel, a quantum channel can transmit quantum key information used to construct a new key (e.g., a new decryption key) from the prior key. As a result, the same key is not reused for decryption and can be discarded after use. Further, a multiplexing system can encode and transmit both classical and quantum communication at the GHz-level transmission rate as a single optical beam, while a demultiplexing can receive and decode the information from the single optical beam.

20 Claims, 13 Drawing Sheets

SYSTEMS AND METHODS FOR SCALING QUANTUM KEY TRANSMISSION TO ENHANCE SECURITY

STATEMENT REGARDING FEDERALLY SPONSORED RESEARCH OR DEVELOPMENT

Not applicable.

FIELD OF THE INVENTION

The present invention generally relates to quantum keys, and more particularly, to scaling the transmission of quantum keys to match the transmission rate of messages.

BACKGROUND

Quantum communication protocols can provide a method of security in communication due to the quantization of energy in mediation of the electromagnetic force. Classical communication through optical means allows communication devices to transmit and receive at relatively high rates. In order to provide secure communication of information, each communication device can transmit information (e.g., encoded messages) and reuse an established decryption key. By reusing the key, the communication devices can continue to transmit information at high rates.

Quantum key distribution protocols have existed for several decades. Several methods have been implemented in published architectures limit the channel rates to a predetermined rate below the rate of information exchange (i.e., communication rate). In addition, most implementations have significant overhead in making projections and measurements to bound the eavesdropper information capacity. Existing solutions have problems working in high clutter and high background environments. Accordingly, communication can be enhanced by transmitting information at nighttime. Most advancements over the past decade have focused on implementations suitable for fiber-based applications.

SUMMARY

According to various aspects of the subject technology, methods and configurations for providing quantum key exchange at higher rates are disclosed. The techniques of the subject technology provide a method for scaling the quantum key transmission rate to the transmission rate of the message transmitted from one device to another. The disclosed solutions provide the ability to enhance security by transmitting a key at high transmission rate, thus allowing the exchange of information without reusing the key.

In one or more aspects, a method for communication is described. The method may include establishing, between a first platform and a second platform, a classical communication channel and a quantum communication channel. The method may further include transmitting at an established rate, using the classical communication channel, a first encoded message and a decryption key from the first platform to the second platform. The method may further include while transmitting the first encoded message and the decryption key, transmitting at the established rate, using the quantum communicating channel, quantum key information from the first platform to the second platform. In some embodiments, the decryption key is configured to decode the first encoded message and the quantum key information is configured decode a second encoded message transmitted subsequent to the first encoded message.

In other aspects, a communication system is described. The communication system may include a classical channel transmitter configured to transmit, at an established rate, classical information including a first encoded message and a decryption key. The communication system may further include a quantum channel transmitter configured to generate a quantum information including quantum key information. The communication system may further include a transmitter subsystem configured to scale a transmission rate of the quantum information to the established rate. The transmitter subsystem may include a multiplexer that encodes and combines the classical information and the quantum information. In some embodiments, the quantum key information is transmitted at the established rate and configured to decode a second encoded message transmitted subsequent to the first encoded message.

In yet other aspects, a communication system is described. The communication system may include a classical channel receiver configured to receive, at an established rate, classical information including a first encoded message and a decryption key. The communication system may further include a quantum channel receiver configured to receive a quantum information including a quantum key. The communication system may further include a receiver subsystem configured to receive the quantum information and the first classical information at the established rate. The receiver subsystem is further configured to decode, using a demultiplexer, to separate the first classical information from the quantum information. The receiver subsystem is further configured to use the first decryption key to decode the first encoded message. The receiver subsystem is further configured to when second classical information is received, use the quantum key to construct a second decryption key used to decode a second encoded message encoded in the second classical information.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

Figure 1:
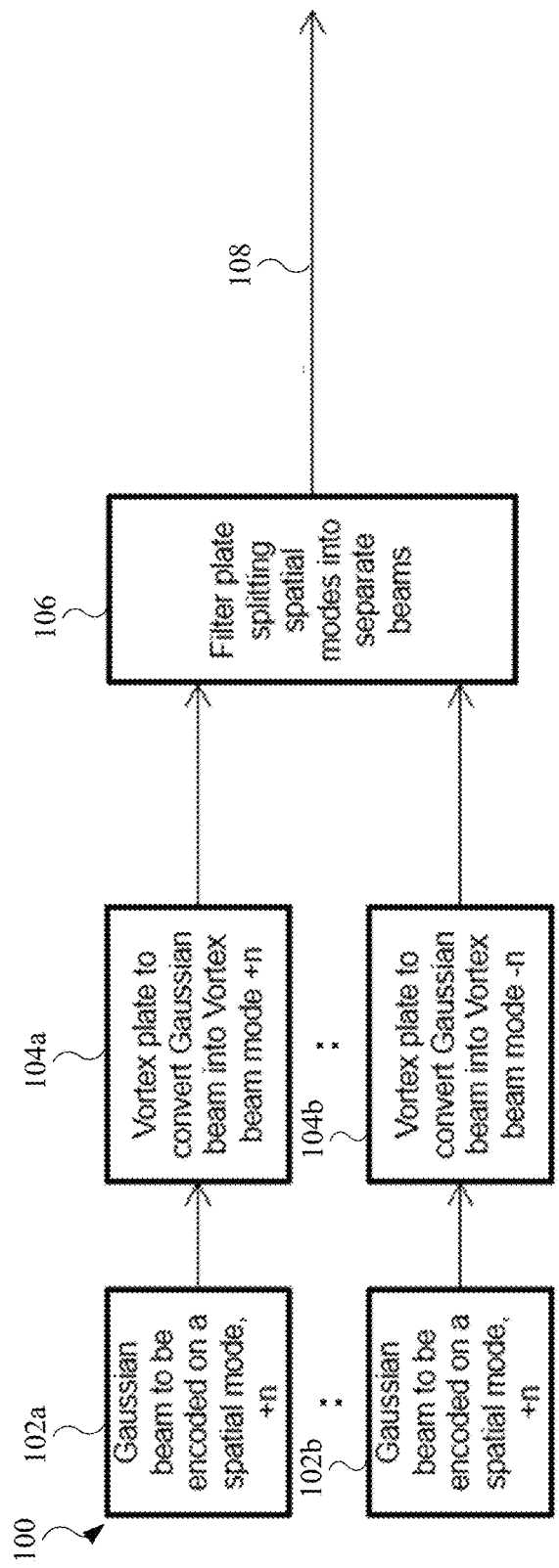
FIG. 1 is a schematic diagram illustrating an example of a transmitter subsystem for spatial mode transmission, according to certain aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

According to some aspects, the subject technology is directed to systems and methods for implementing a scalable bandwidth for quantum communication protocol. The quantum communication can be scaled to a bandwidth that is the same as that of classical communication protocol. The phrase "classical communication" as used in this detailed description and in the claims refers to data streams representing classical bits (e.g., 0 or 1). These data streams can be sent by, for example, optical pulses. The phrase "quantum communication" as used in this detailed description and in the claims refers to data streams representing particles (e.g., photons of light) that can take a state of superposition, in which the particles can simultaneously represent combinations of 0 and 1. In some embodiments, the particles take the form of quibits. Some transmission protocols provide the transmission of both classical and quantum communication, including encrypted forms of classical and quantum communication. For example, quantum key distribution (QKD) involves sending encrypted data (e.g., a message) using classical information, while sending decryption information (e.g., a key) through encrypted quantum communication. Throughout this detailed description, various embodiment show and describe quantum and classical information transmitted in parallel.

The described systems and methods allow for scaling quantum communication to 1 Gigahertz (GHz) or more, and in some cases, to 10 GHz or more. As a result of the scaled rate, once a key (e.g., quantum key) is shared between platforms (e.g., communication devices) through a quantum communication channel, a secure communication channel between the platforms is established, even when information (e.g., messages) is subsequently shared through a classical communication channel. Moreover, scaling quantum communication allows for transmitting classical and quantum communication in parallel through a single optical beam. In addition to sharing messages through the communication channel, the quantum communication channel can provide quantum key information used to construct, or build up, a new or updated key such that the same key is not used more than once, thus enhancing channel security by not reusing the same key.

Given a two-platform system used for communication, each platform may include a respective classical channel transmitter and a classical channel receiver for two-way (e.g., bi-directional) communication channels, while only one of the two platforms requires a quantum channel transmitter and the other requires a quantum channel receiver. When a key is shared from the quantum transmitter to the quantum receiver at a rate on the order of GHz, a secure quantum channel is established, thus allowing secure two-way communication over the classical communication channels.

In order to transmit at high rates, one or more systems can be used alone or in combination. For example, the transmission may occur through channelization in spectral, temporal, and spatial modes. Spatial multiplexing can leverage basis sets and manipulate Gaussian beams. Temporal multiplexing can use a shift register to generate pulses in a time sequence. Spectral multiplexing can receive and manipulate light at different wavelengths. While traditional systems tend to use one mode, the systems and methods described herein may leverage any one or more of the spectral, temporal, and spatial modes in order to optimize the channel.

The described embodiments offer several benefits. For example, the described embodiments offer transmission at high data rates without reusing the key provides efficient and secure communication, as reusing keys decreases the security at the expense of lower secure data rates. Additionally, the described embodiments offer data transmission that is less susceptible to background light, as compared to many existing systems that will only reliably operate at night.

Figure 2:
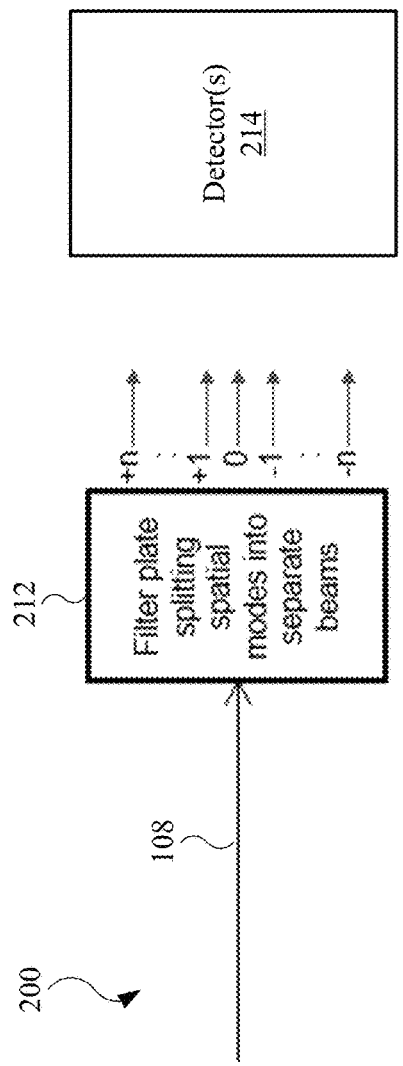
FIG. 2 is a schematic diagram illustrating an example of a receiver subsystem for spatial mode detection, according to certain aspects of the present disclosure.

FIGS. 1 and 2 illustrate multiplexing and demultiplexing systems, respectively, for channelizing in spatial mode. FIG. 1 is a schematic diagram illustrating an example of a transmitter subsystem 100, according to certain aspects of the present disclosure. The transmitter subsystem 100 is designed to transmit encoded energy. As shown, the transmitter subsystem 100 includes an optical source 102a and an optical source 102b (representative of additional optical sources). The optical sources 102a and 102b may generate Gaussian beams (i.e., light beams governed by a Gaussian function) split into spatial modes +n through −n. The transmitter subsystem 100 includes a vortex plate 104a and vortex plate 104b (representative of additional vortex plates). The Gaussian beams generated from the optical sources 102a and 102b pass through the vortex plates 104a and 104b, respectively, thus converting the Gaussian beams into vortex beams orthogonal to each other and to other topological modes.

The vortex beams leave the vortex plates 104a and 104b and enter a filter plate 106. The filter plate 106 splits the received beams into separate beams, thus allowing the beams to be manipulated and encoded through pulsing (including sequential pulsing), multiplexing, or other forms of mixing. As a result, the light exiting the filter plate 106 takes the form of a single optical beam 108 in a spatial mode. Using the transmitter subsystem 100, the single optical beam 108 is transmitted as an optical signal at a rate of 1 GHz or more, and in some cases, 10 GHz or more.

FIG. 2 is a schematic diagram illustrating an example of a receiver subsystem 200, according to certain aspects of the present disclosure. The receiver subsystem 200 includes a filter plate 212 that receives the single optical beam 108. The filter plate 212 is designed to split the single optical beam 108 (generated in in FIG. 1) into the different spatial mode beams, from +n to −n. The receiver subsystem 200 further includes one or more detectors 214. The separated light beams enter the one or more detectors 214, where each spatial mode is detected and the information carried by the light in the spatial modes is decoded.

Figure 3:
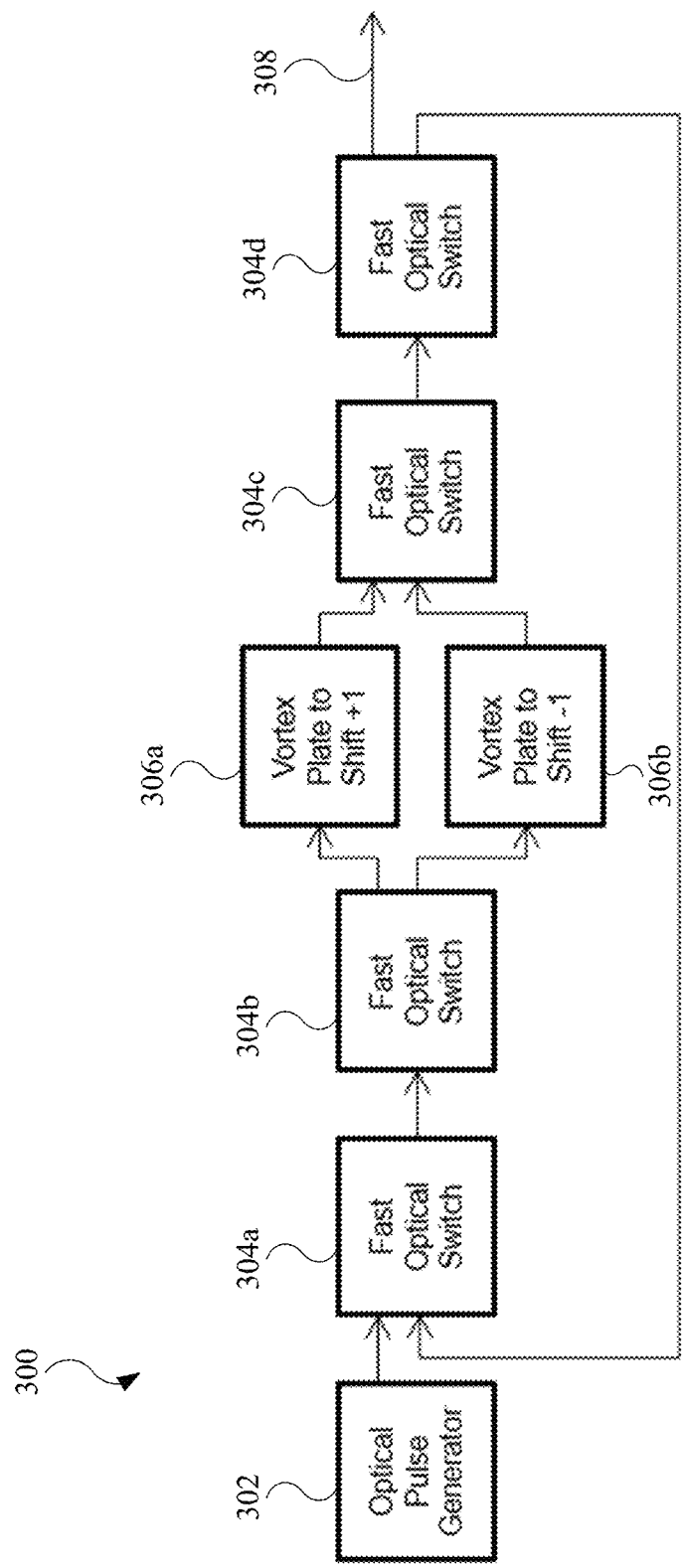
FIG. 3 is a schematic diagram illustrating an example of a transmitter subsystem for temporal mode transmission, according to certain aspects of the present disclosure.

FIG. 3 is a schematic diagram illustrating an example of a transmitter subsystem 300 for transmitting in a temporal mode, according to certain aspects of the present disclosure. The transmitter subsystem 300 includes a light source 302 that takes the form of an optical pulse generator. Also, the light source 302 can generate light pulses in Gaussian mode.

The light source 302 generates light pulses that pass through a series of optical switches and vortex plates. For example, an optical switch 304a determines whether light is received from the light source 302 or from a subsequent optical switch (discussed below). The optical switch 304a then switches the light to an optical switch 304b. Based on a switching configuration, the optical switch 304b directs the light to one a vortex plate 306a and a vortex plate 306b. The vortex plates 306a and 306b can shift the mode of a pulse duration with respect to other modes. For example, for a set of pulses passing through the transmitter subsystem 300, each pulse can pass through the vortex plates 306a and 306b to increase or decreases, respectively, the topological mode number to arrive at a desired sequence of the topological mode order of the pulse sequence (e.g., +10, +8, −5, −8).

The transmitter subsystem further includes an optical switch 304c that determines from which of the vortex plates 306a and 306b the light is received. The optical switch 304c then passes the light to an optical switch 304d. Based on a configuration of the optical switch 304d, the light leaves the transmitter subsystem 300 as a single optical beam 308 via the optical switch 304d, or the optical switch 304d sends the light back through the transmitter subsystem 300 to change the topological mode order for that portion of the pulse sequence. For example, if the mode order is +3 and the desired pulse mode order is +4, the optical switch 304d can cause the light to enter the optical switches 304a and 304b, where the optical switch 304b causes the light to enter the vortex plate 306a. As another example, if the mode order is +3 and the desired mode order for that portion of the sequence is +3, the optical switch 304d can cause the light to exit the transmitter subsystem 300 as part of the single optical beam 308. Accordingly, the transmitter subsystem 300 can generate modes that are multiplexed in time with the desired sequence of spatial mode order. Also, using the transmitter subsystem 300, the single optical beam 308 is transmitted as an optical signal at a rate of 1 GHz or more, and in some cases, 10 GHz or more.

Figure 4:
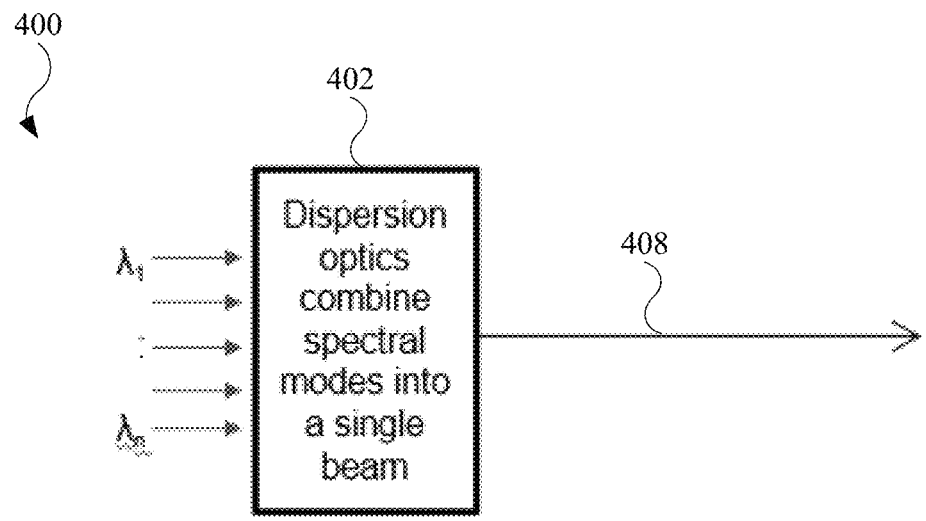
FIG. 4 is a schematic diagram illustrating an example of a transmitter subsystem for spectral mode transmission, according to certain aspects of the present disclosure.
Figure 5:
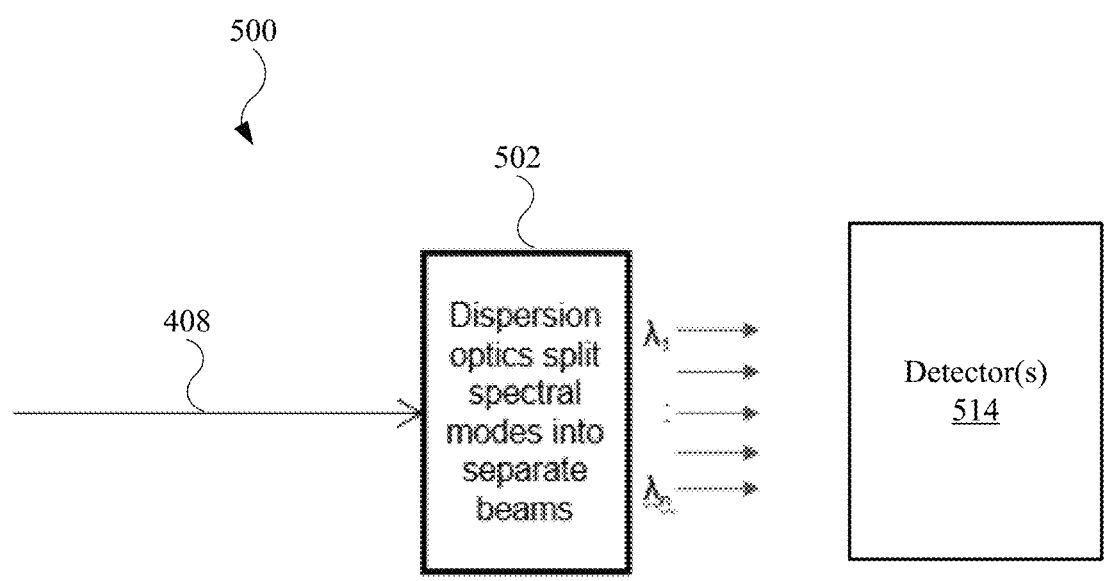
FIG. 5 is a schematic diagram illustrating an example of a receiver subsystem for spectral mode detection, according to certain aspects of the present disclosure.

FIGS. 4 and 5 illustrate multiplexing and demultiplexing systems, respectively, for channelizing in spectral mode. FIG. 4 is a schematic diagram illustrating an example of a transmitter subsystem 400, according to certain aspects of the present disclosure. The transmitter subsystem 400 includes dispersion optics 402 that receives light from a light source (not shown in FIG. 4) in multiple spectral modes. Put differently, the light received at the dispersion optics 402 is separated into wavelengths $\lambda_1$ through $\lambda_n$. The dispersion optics 402 can combine the light of wavelengths $\lambda_1$ through $\lambda_n$ through modulation and recombination (as an example of multiplexing), encode the light, and transmit the encoded light in a single optical beam 408. Also, using the transmitter subsystem 400, the single optical beam 408 is transmitted as an optical signal at a rate of 1 GHz or more, and in some cases, 10 GHz or more.

FIG. 5 is a schematic diagram illustrating an example of a receiver subsystem 500, according to certain aspects of the present disclosure. The receiver subsystem 500 receives the single optical beam 408 (shown in FIG. 4) at dispersion optics 502. The dispersion optics 502 is designed to split the single optical beam 408 into the different spectral modes, wavelengths $\lambda_1$ through $\lambda_n$. The receiver subsystem 500 further includes one or more detectors 514. The separated light beams enter the one or more detectors 514, where each spectral mode is detected and the information carried by the light in the spectral modes is decoded.

Figure 6:
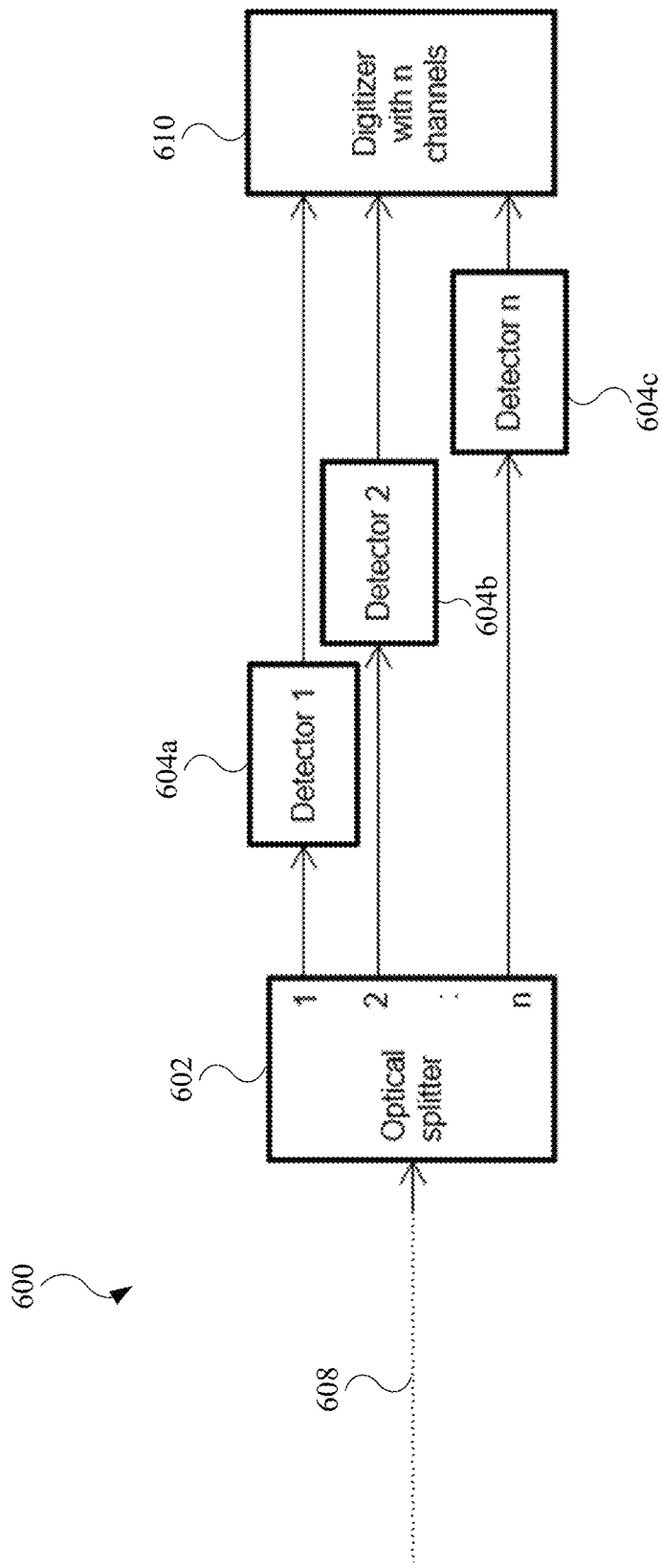
FIG. 6 is a schematic diagram illustrating an example of a detector system for scaling detector bandwidth, according to certain aspects of the present disclosure.

FIG. 6 is a schematic diagram illustrating an example of a detector system 600 for scaling detector bandwidth, according to certain aspects of the present disclosure. The detector system 600 includes an optical splitter 602 that receives a light beam 608. The light beam 608 may take the form of a high rate optical signal transmitted at a rate of 1 GHz or more, and in some cases, 10 GHz or more. or more. The optical splitter 602 can split the light beam 608 into one or more spectral modes (e.g., modes 1 through n) corresponding to, for example, an order of different wavelengths. Additionally, the detector system 600 includes several detectors. As shown, the detector system 600 includes a detector 604a, a detector 604b, and a detector 604c, representing detectors 1, 2 and n, respectively. In some embodiments, the detectors include single-photon detectors.

In order to get a throughput on the order of GHz, the number of detectors should be selected according to the equation $$n = B_T/B_D$$

where n is the number of detectors, $B_T$ is the total bandwidth, and $B_D$ is the detector bandwidth. Accordingly, when 10 GHz is the desired throughput and the detector bandwidth is 500 Megahertz (MHz), then 20 detectors are required. Additionally, the detector system 600 further includes a digitizer 610 designed to convert the light received from the detectors 604a, 604b, and 604c into digital signals. The digitizer 610 includes n channels and processing circuitry to convert n channels to digital signals. Accordingly, the detector system 600 provides a process for effectively scaling to a desired bandwidth.

Figure 7:
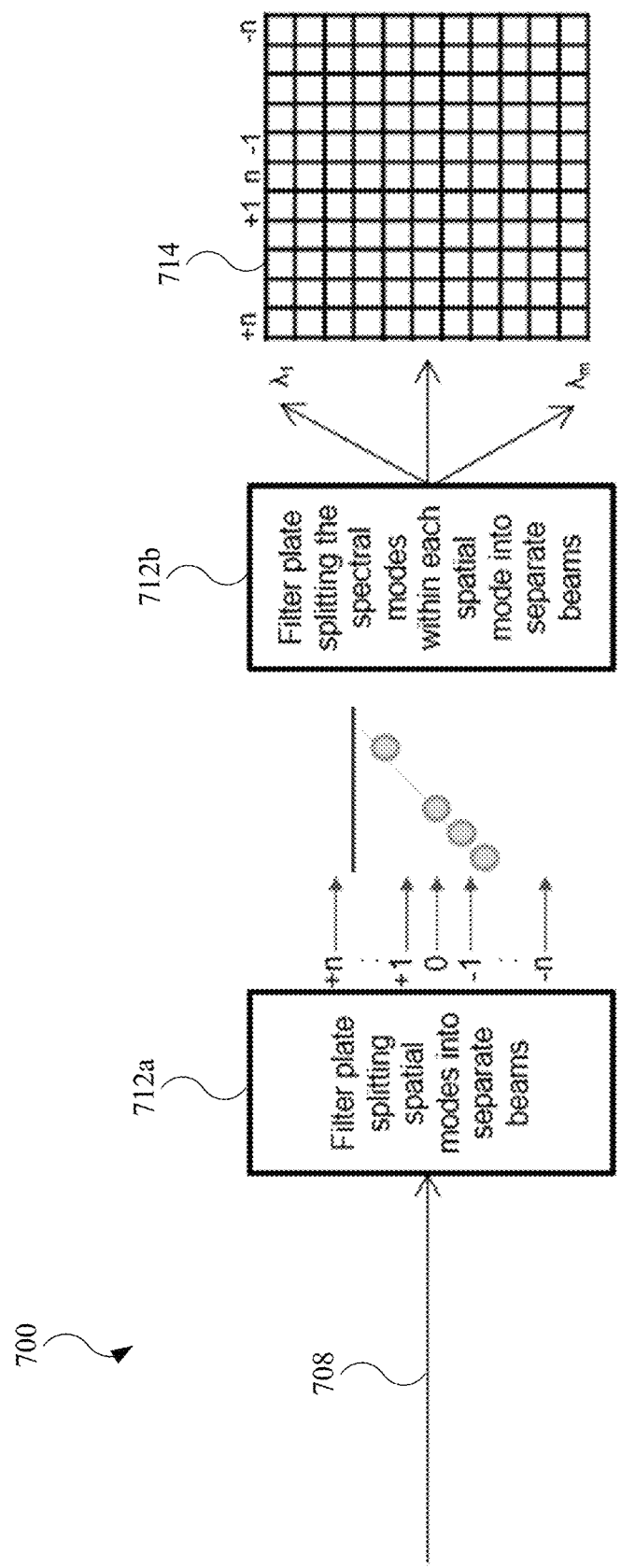
FIG. 7 is a schematic diagram illustrating an example of a receiver subsystem for spatial and spectral mode detection, according to certain aspects of the present disclosure.

FIG. 7 is a schematic diagram illustrating an example of a receiver subsystem 700 for spatial and spectral mode detection, according to certain aspects of the present disclosure. The receiver subsystem 700 includes a filter plate 712a that receives a single optical beam 708 as an encoded beam. The filter plate 712a is designed to split the single optical beam 708 into the different spatial mode beams, from +n to -n. The receiver subsystem 700 further includes a filter plate 712b that receives the spatial mode beams from the filter plate 712a. The filter plate 712b receives the spectral mode beams, and split spectral mode beams within each spatial mode into separate beams, with wavelengths $\lambda_1$ through $\lambda_n$.

The receiver subsystem 700 further includes a detector 714 used to detect the received light beams from the filter plate 712b. The detector 714 may include a Geiger-mode detector that can detect and decode multiple different modes (e.g., spatial and spectral modes) in parallel. For detection of all encoded modes in parallel, two dispersion elements can be used to allow detection with a Geiger mode array. Other implementations can use the 'shift register' approach to use fewer detectors. However, this allows all channels to be detected at the same time. With regard to multiplexing, the multiplexing uses the same elements in reverse to combine the separate channels into a single optical beam, with each having its own data stream. In that case, the array can consist of a fiber array routed from separate sources.

Figure 8:
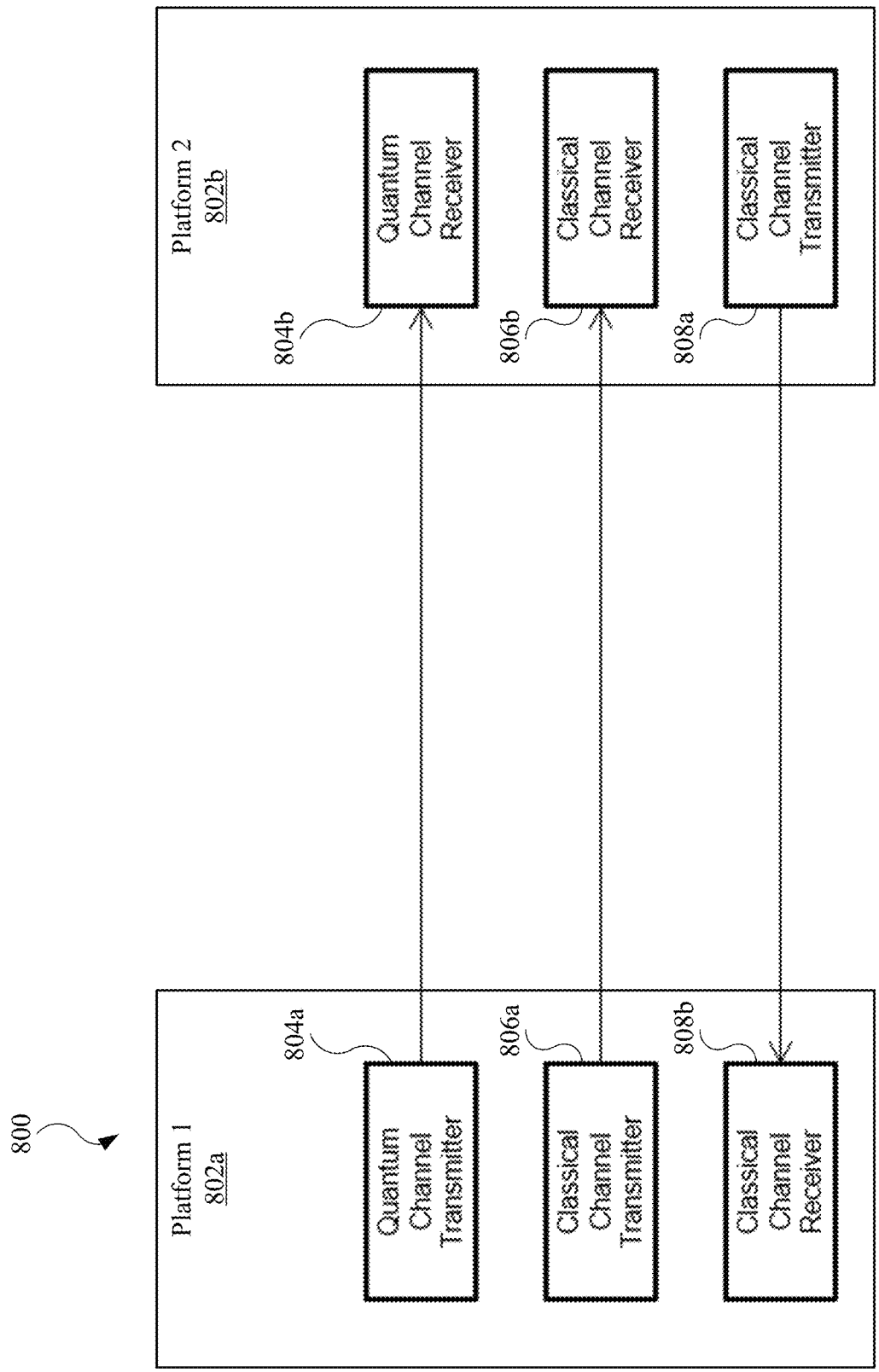
FIG. 8 is a schematic diagram illustrating an example of a combined quantum and classical communication system, according to certain aspects of the present disclosure.

FIG. 8 is a schematic diagram illustrating an example of a system 800 that includes a combined quantum and classical communication system, according to certain aspects of the present disclosure. As shown, the system 800 includes a platform 802a and a platform 802b, representing two communication devices. The platform 802a includes a quantum channel transmitter 804a that transmits information over quantum communication, a classical channel transmitter 806a that transmits information over classical communication, and a classical channel receiver 808b that receives information over classical communication. The platform 802b includes a quantum channel receiver 804b that receives information over quantum communication, a classical channel receiver 806b that receives information over classical communication, and a classical channel transmitter 808a that transmits information over classical communication. Based on the components shown in FIG. 8, the system 800 is designed for one-way quantum communication between the quantum channel transmitter 804a and the quantum channel receiver 804b, and also designed for two-way classical communication between the respective classical transmitters and receivers of the platforms 802a and 802b. Also, while several arrows are shown as indicating a direction of information sent, the various techniques for multiplexing and encoding can be used to send, for example, a single optical beam of light from the platform 802a to the platform 802b, and vice versa. Accordingly, the information transmitted from transmitters to receivers may be transmitted at 1 GHz or more, and in some cases, at 10 GHz or more. Similarly, the various techniques for demultiplexing, detecting, and decoding of the multiplexed and encoded information may be performed by the receiving platform (e.g., one of platform 802a and platform 802b). Also, each of the platforms 802a and 802b may include transmitter subsystems and receiver subsystems to carry out the functions of transmitter subsystems and receiver subsystems, respectively, shown and described herein.

In order to establish secure communication, the quantum channel transmitter 804a transmits encoded information in the form of a quantum key to the quantum channel receiver 804b. Additionally, the classical channel transmitter 806a can transmit information to the classical channel receiver 806b for verification and error correction. Once the quantum key is agreed upon, the platforms 802a and 802b can commence two-way communication between each other using classical communication. When the encoded information is sent at transmission rates on the order of GHz (e.g., 10 GHz or more), a secure quantum channel is established, and the ability of third-party eavesdroppers recovering information is eliminated or substantially reduced.

As an example of secure transmission of information, when communication is established through quantum key transfer, the classical channel transmitter 806a can transmit information (e.g., a message) encoded with a key (e.g., an initial key) that is shared with the classical channel receiver 806b based upon establishing communication via the quantum key. The classical channel receiver 806b receives and decodes the information using the key. Moreover, while sending the information, the quantum channel transmitter 804a also transmits additional encoded information related to a key. For example, the additional coded information may include quantum key information used to construct a new key by building on the initial key. The new key can be used to decode subsequent information (e.g., a message transmitted by the classical channel transmitter 806a at a later time). As a result, the initial key is not reused. This can be an iterative process such that when subsequent messages are sent by the classical channel transmitter 806a, additional information related to an additional key is simultaneously sent by the quantum channel transmitter 804a, with the additional information being used to construct yet another new key for decoding a subsequent message. In this manner, each version of the key is used once and is discarded. While the example process illustrates classical transmission initiated from the platform 802a, it should be noted that classical transmission can also be initiated from the platform 802b.

Additionally, the transmission of quantum and classical information can be transmitted and received in parallel, in spatial, spectral, and/or temporal modes, based upon the multiplexing and demultiplexing techniques described herein. As a result, the information related to the message (sent by classical communication) and to the key construction (sent by quantum communication) can be sent at rate on the order of 1 GHz or more, and in some cases, 10 GHz. Moreover, a combination of spatial, spectral, or temporal multiplexing may be selected to optimize the channel based on the current noise characteristics of the channel.

Figure 9:
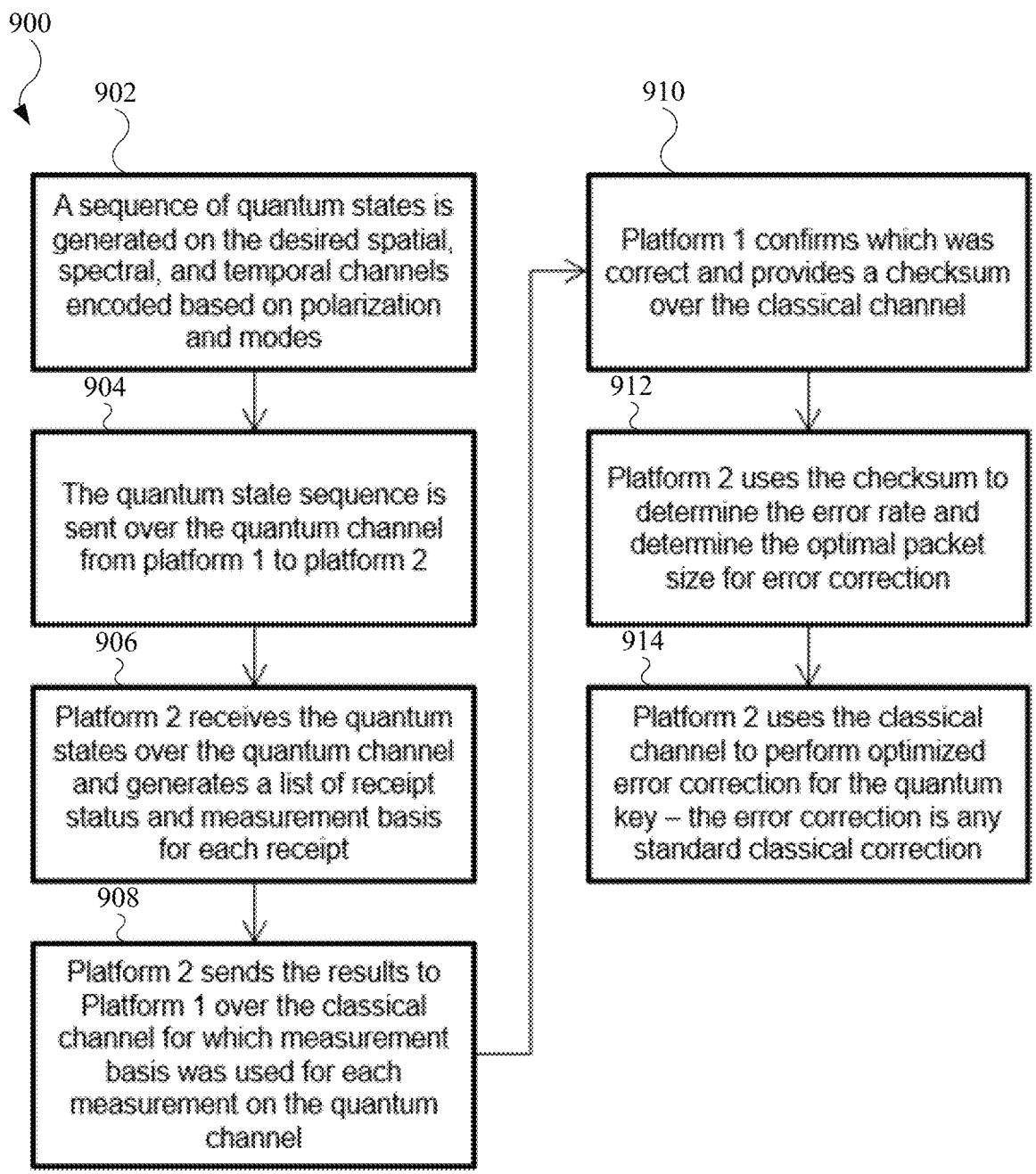
FIG. 9 is a flow diagram illustrating an example of a method for quantum key generation, according to certain aspects of the present disclosure.

FIG. 9 is a flow diagram illustrating an example of a method 900 for quantum key generation, according to certain aspects of the present disclosure. At operation block 902, a sequence of quantum states is generated on the desired spatial, spectral, and temporal channels encoded based on polarization and modes. At operation block 904, the quantum state sequence is sent over the quantum channel from platform 1 to platform 2. At operation block 906, Platform 2 receives the quantum states over the quantum channel and generates a list of receipt status and measurement basis for each receipt. At operation block 908, Platform 2 sends the results to Platform 1 over the classical channel for which measurement basis was used for each measurement on the quantum channel. At operation block 910, Platform 1 confirms which was correct and provides a checksum over the classical channel. At operation block 912, Platform 2 uses the checksum to determine the error rate and determine the optimal packet size for error correction. At operation block 914, Platform 2 uses the classical channel to perform optimized error correction for the quantum key. The error correction is any standard classical correction. Using the method for quantum key generation described in the method 900, two-way channel communication using a standard error correction results in a corrected key with a generation rate set by quantum channel error rate, quantum channel rate, classical channel rate, and classical channel error rate.

Figure 10:
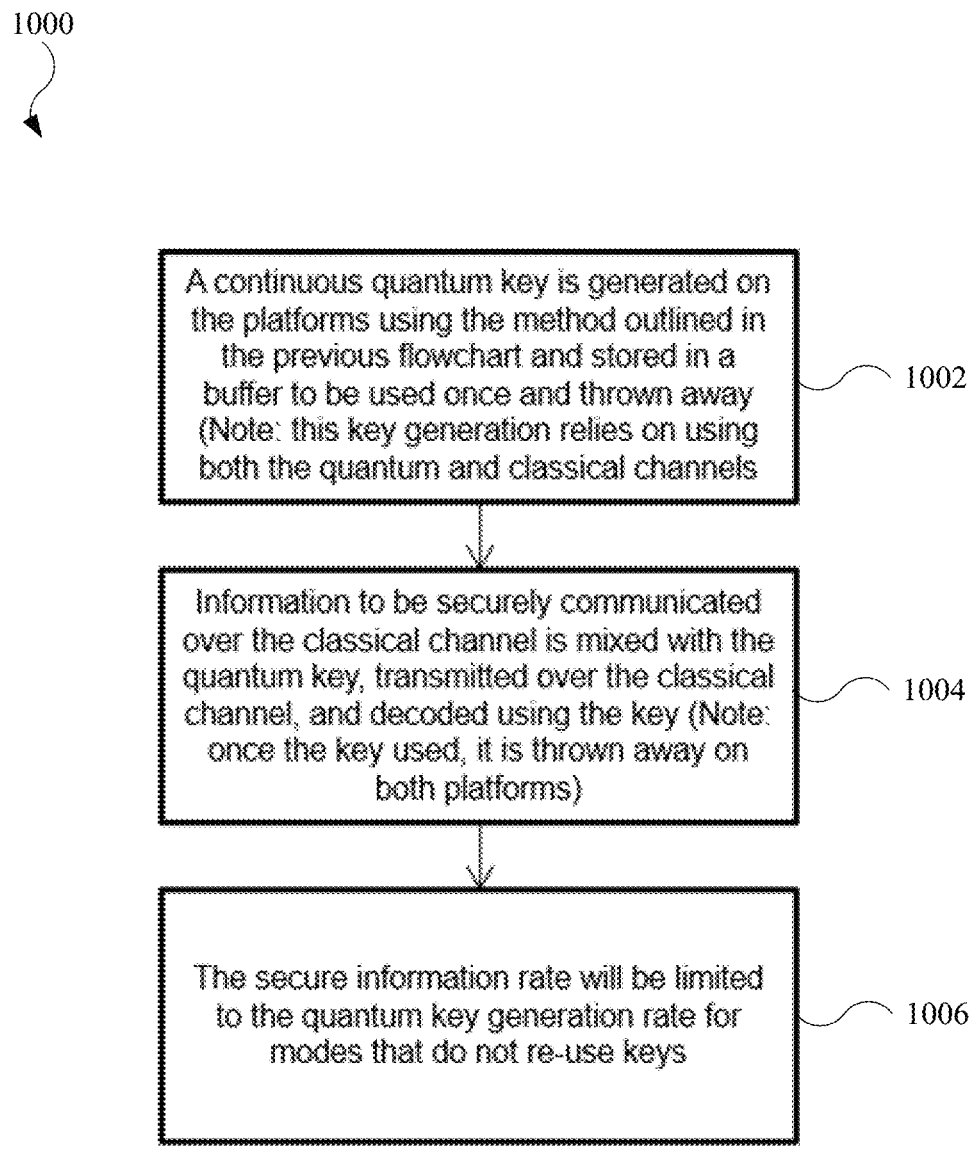
FIG. 10 is a flow diagram illustrating an example of a method for using quantum and classical channels for simultaneous operation, according to certain aspects of the present disclosure.

FIG. 10 is a flow diagram illustrating an example of a method 1000 for using quantum and classical channels for simultaneous operation, according to certain aspects of the present disclosure. At operation block 1002, a continuous quantum key is generated on the platforms using the method outlined in accordance with the method 900, and stored in a buffer to be used once and thrown away (Note: this key generation relies on using both the quantum and classical channels). At operation block 1004, information to be securely communicated over the classical channel is mixed with the quantum key, transmitted over the classical channel, and decoded using the key. Once the key is used, it is thrown away on both platforms. At operation block 1006, the secure information rate will be limited to the quantum key generation rate for modes that do not re-use keys.

Figure 11:
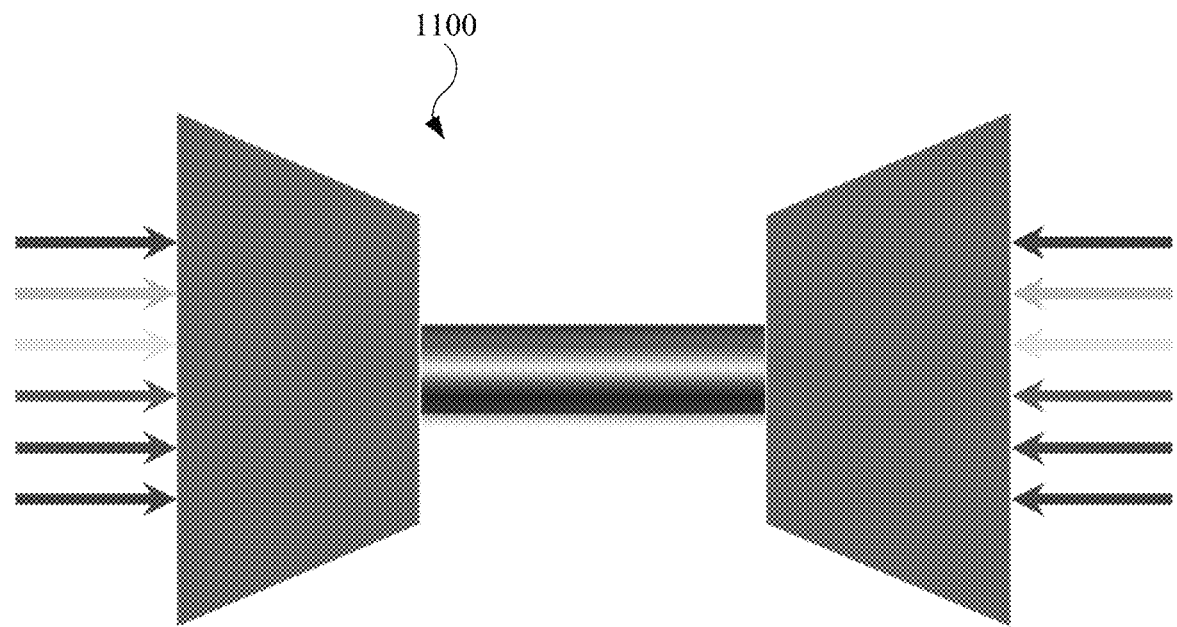
FIG. 11 is a diagram illustrating an example of a multiplexing system, according to certain aspects of the present disclosure.

FIG. 11 is a diagram illustrating an example of a multiplexing system 1100, according to certain aspects of the present disclosure. The multiplexing system 1100, as well as other multiplexers shown and described herein, is designed to receive multiple inputs, including multiple optical inputs, and transmit the inputs over a single output transmission, including a single optical beam. Additionally, the multiplexing system 1100 is designed to combine inputs in spatial, spectral, and temporal modes. The multiplexing system 1100 may include one or more logical circuits and digital circuits to perform the required tasks. In some embodiments, the multiplexing system 1100 is an optical ring multiplexer. Conversely, a demultiplexing system (not shown) is designed to switch a single input transmission (e.g., single optical beam) into several outputs, including several optical outputs.

Figure 12:
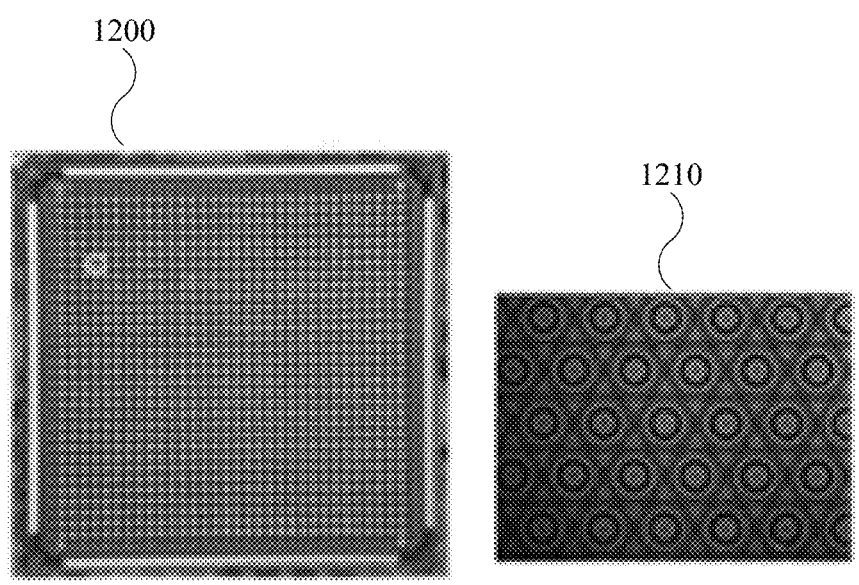
FIG. 12 is a diagram illustrating an example of a Geiger mode detector for multiplexing, according to certain aspects of the present disclosure.

FIG. 12 is a diagram illustrating an example of a Geiger mode detector 1200 for multiplexing, according to certain aspects of the present disclosure. The Geiger mode detector 1200 allows for multiplexing in multiple dimensions. Further, the Geiger mode detector 1200 allows for scaling of bandwidths using macro-pixels. In some embodiments, the Geiger mode detector 1200 takes the form of Geiger-mode avalanche photo-detectors (GmAPDs). The APDs may include a material choice and/or purposely designed structures to exhibit ultra-low excess noise values under coherent detection operation. As shown in an enlarged view, the Geiger mode detector 1200 includes an optical system 1210 with micro-lens arrays.

Figure 13A:
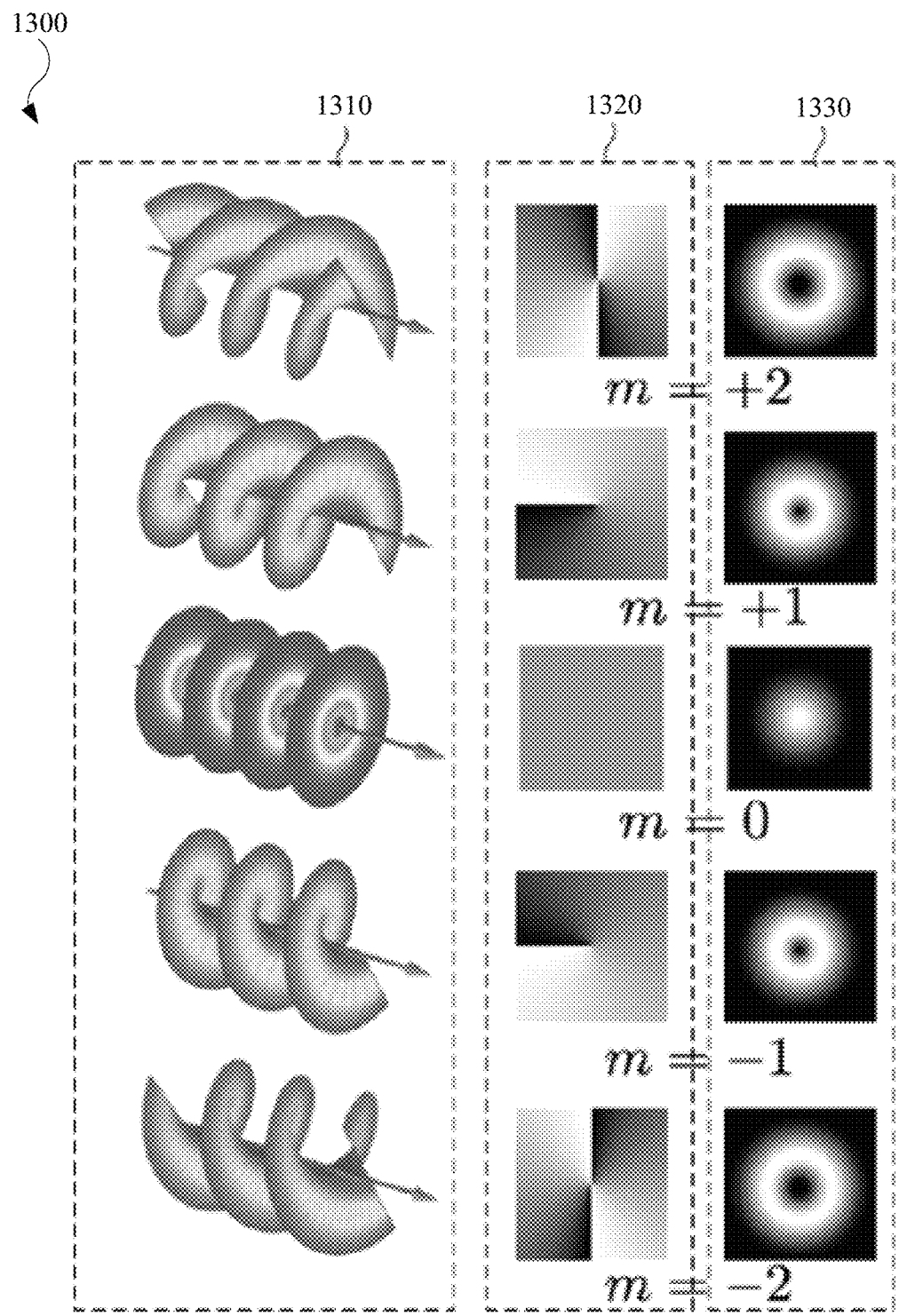
FIG. 13A and FIG. 13B illustrate a vortex system for multiplexing, according to certain aspects of the present disclosure.

FIG. 13A is a schematic diagram illustrating an example of a vortex system for multiplexing, according to certain aspects of the present disclosure. As shown, a plot 1300 of an example of optical orbital angular momentum (OAM) states serves as an orthogonal basis set for OAM communication. The plot 1300 depicts helical structures 1310, phase-front profiles 1320 and intensity profiles 1330 of a light beam. In the helical structures 1310, the light beam is twisted similar to a corkscrew around an axis of travel, and due to the twisting, the light waves can cancel each other out at the axis and generate an optical vortex. The optical vortex, also known as a photonic quantum vortex, screw dislocation or phase singularity, is a zero of an optical field, which is a point of zero light intensity. The spinning induces a torque on an electric dipole, and thus carries an OAM with the wave train. The OAM of light can be observed in the torque imparted to an atom in a field-carrying OAM and is different from the spin angular momentum, which is responsible for circular polarization.

The helical structures 1310 correspond to OAM values of m=+2, m=+1, m=0, m=−1, and m=−2. The OAM value is always an integer, and can be positive or negative, depending on the direction of the twist. The higher the number of the twist, the faster the light is spinning around the axis. The phase-front profiles 1320 correspond to the helical structures 1310 and show five different states associated with OAM values of m=+2, m=+1, m=0, m=−1, and m=−2. The intensity profiles 1330 also depict five different states associated with OAM values of m=+2, m=+1, m=0, m=−1, and m=−2, of which four states (m=+2, m=+1, m=−1, and m=−2) represent optical vortices and have dark spots in the middle that represent zero optical field. The subject technology leverages the OAM states as an orthogonal basis set for OAM communication.

Figure 13B:
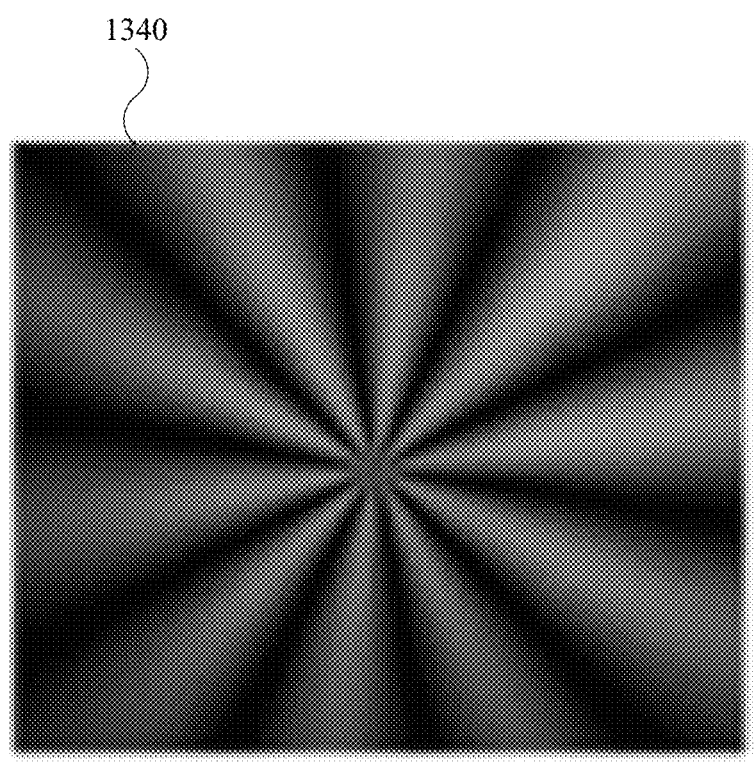

FIG. 13B illustrates an example of a vortex plate 1340. The vortex plate 1340 is designed to receive optical inputs (e.g., Gaussian beams) and convert the optical inputs into profiles shown in FIG. 13A.

Figure 14:
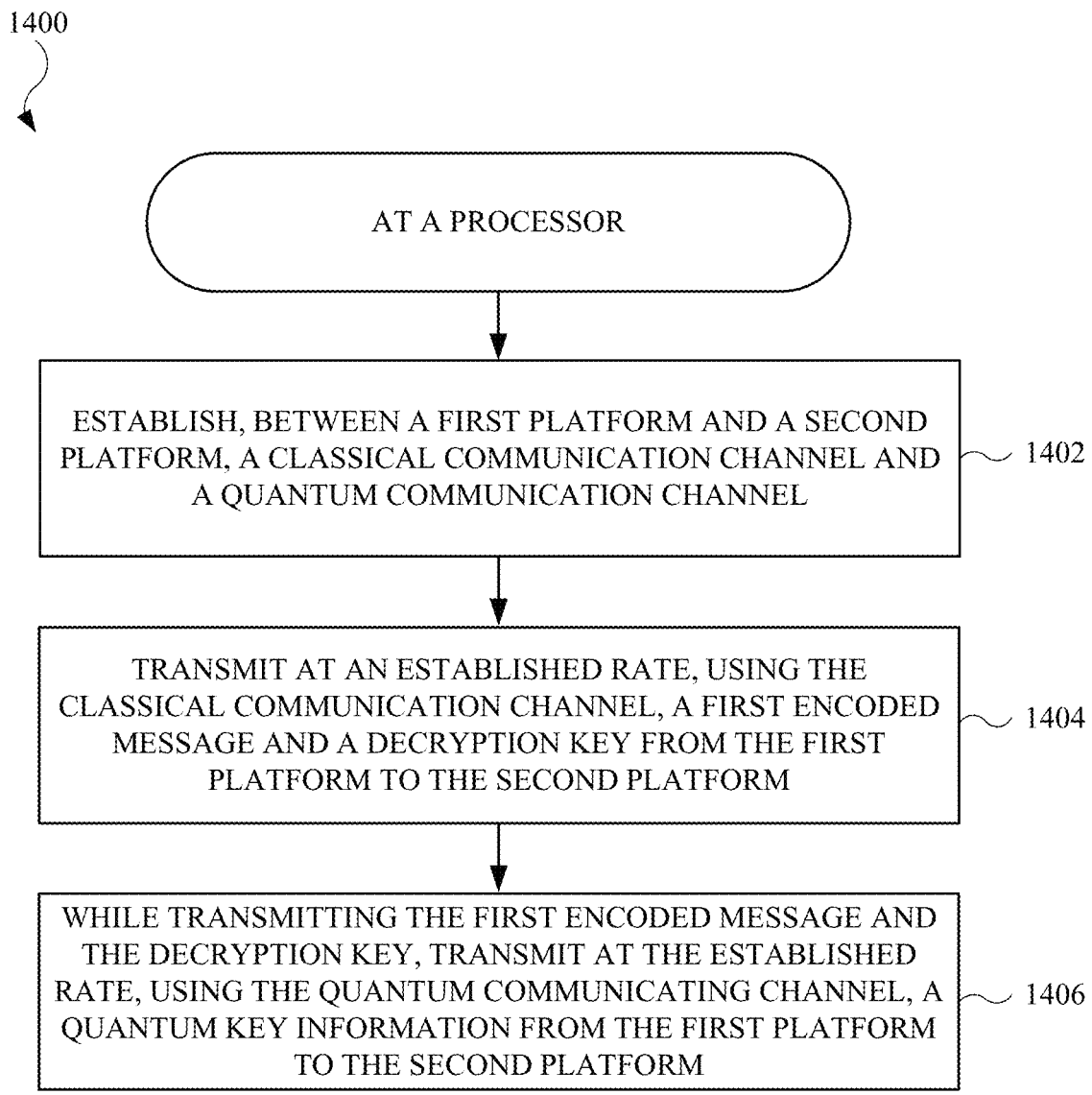
FIG. 14 is a flowchart illustrating a method for communication, according to certain aspects of the present disclosure.

FIG. 14 is a flowchart illustrating a method 1400 for communication, according to certain aspects of the present disclosure. A processor, one or more processors, or processing circuitry, can be used to carry out the steps of the method 1400.

At step 1402, a classical communication channel and a quantum communication channel are established between a first platform and a second platform. In some embodiments, the first platform includes a quantum channel transmitter that transmits quantum information in the form of quantum key information to a quantum channel receiver located on the second platform. When the quantum channel receiver confirms the quantum, the communication channels are established.

At step 1404, a first encoded message and a decryption key are transmitted, using the classical communication channel, from the first platform to the second platform. The transmission may occur at an established rate. In some embodiments, the established rate is 1 GHz or more. Moreover, in some embodiments, the established rate is 10 GHz or more.

At step 1406, while transmitting the first encoded message and the decryption key are transmitted, quantum key information is transmitted, using the quantum communicating channel, from the first platform to the second platform. In this manner, classical and quantum information can be transmitted in parallel. The classical information and the quantum information can be encoded and transmitted, via an optical beam, in parallel using multiplexing schemes based on spatial, spectral, and/or temporal modes. This allows both the classical and quantum information to be scaled and transmitted at the established rate. Also, a demultiplexer can be used to split the optical beams into spatial, spectral, and/or temporal modes (depending on the selected modes(s) used in multiplexing). The decryption key is configured to decode the first encoded message and the quantum key information is used decode a second encoded message transmitted subsequent to the first encoded message. As a result, the decryption key can be discarded after use.

Figure 15:
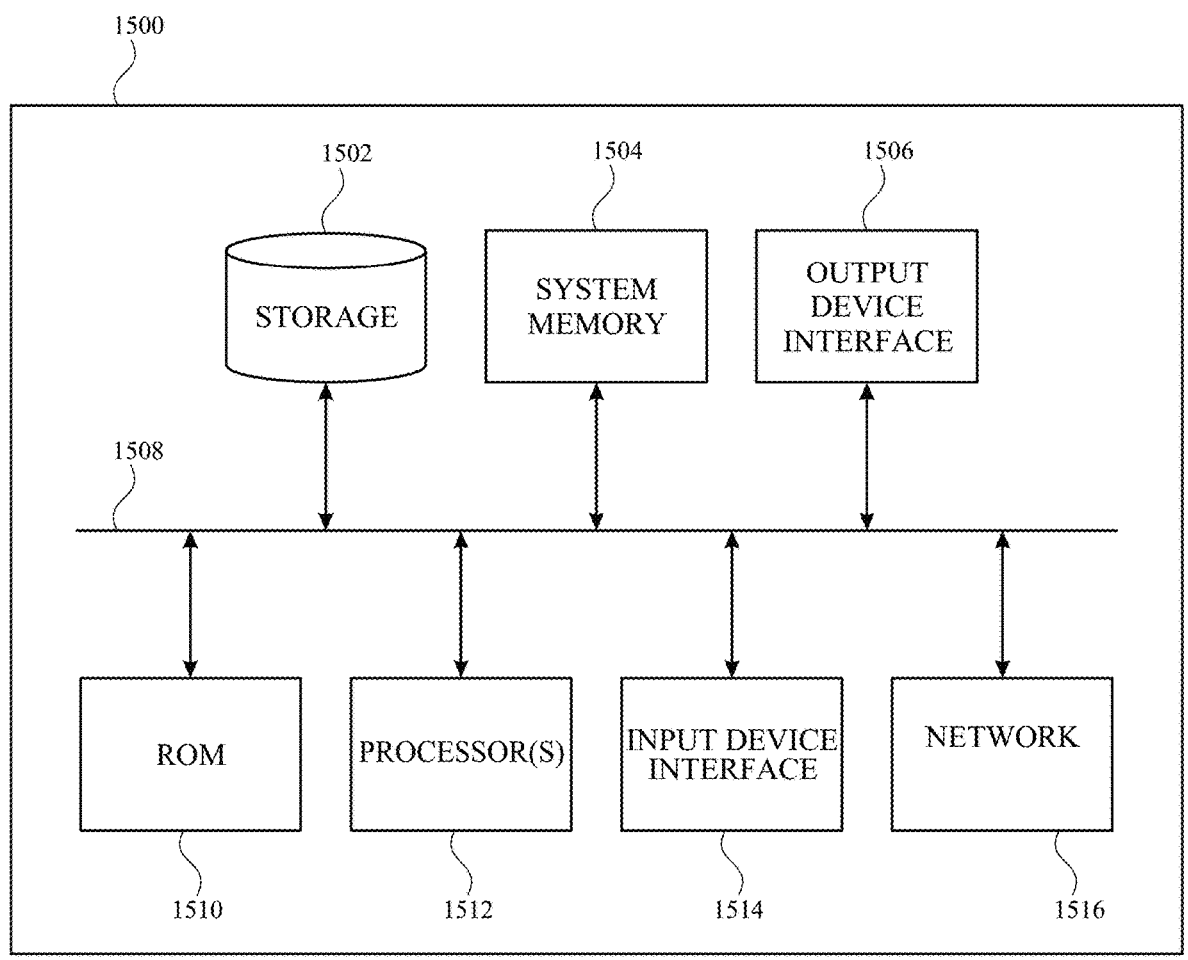
FIG. 15 is a schematic diagram conceptually illustrating an electronic system with which some aspects of the subject technology are implemented.

FIG. 15 is a schematic diagram conceptually illustrating an electronic system 1500 with which some aspects of the subject technology are implemented. The electronic system 1500, for example, can be a desktop computer, a laptop computer, a tablet computer, a server, or any device that can control and/or perform processing of data, including aggregation of data, or generally any electronic device that can process data. Such an electronic system may include various types of computer-readable media and interfaces for various other types of computer-readable media. The electronic system 1500 includes a bus 1508, processing unit(s) 1512, a system memory 1504, a read-only memory (ROM) 1510, a permanent storage device 1502, an input device interface 1514, an output device interface 1506, and a network interface 1516, or subsets and variations thereof.

The bus 1508 collectively represents all system, peripheral, and chipset buses that communicatively connect the numerous internal devices of electronic system 1500. In one or more implementations, the bus 1508 communicatively connects the processing unit(s) 1512 with the ROM 1510, the system memory 1504, and the permanent storage device 1502. From these various memory units, the processing unit(s) 1512 retrieve(s) instructions to execute and data to process in order to execute the processes of the subject disclosure. The processing unit(s) 1512 can be a single processor or a multicore processor in different implementations.

The ROM 1510 stores static data and instructions that are needed by processing unit(s) 1512 and other modules of the electronic system. The permanent storage device 1502, on the other hand, is a read-and-write memory device. This device is a nonvolatile memory unit that stores instructions and data even when the electronic system 1500 is off. One or more implementations of the subject disclosure use a mass-storage device (such as a magnetic or optical disk and its corresponding disk drive) as the permanent storage device 1502.

Other implementations use a removable storage device (such as a flash drive, and its corresponding drive) as the permanent storage device 1502. Like the permanent storage device 1502, the system memory 1504 is a read-and-write memory device. However, unlike storage device 1502, the system memory 1504 is a volatile read-and-write memory, such as random access memory (RAM). The system memory 1504 stores any of the instructions and data that the processing unit(s) 1512 need(s) at runtime. In one or more implementations, the processes of the subject disclosure, for example, the trained ROM, are stored in the system memory 1504, the permanent storage device 1502, and/or the ROM 1510. From these various memory units, the processing unit(s) 1512 retrieve(s) instructions to execute and data to process in order to execute the processes of one or more implementations. In one or more implementations, the processing unit(s) 1512 execute(s) various processes and algorithms of the subject technology, including algorithms and methods of FIGS. 1-10.

The bus 1508 also connects to the input device interface 1514 and the output device interface 1506. The input device interface 1514 enables a user to communicate information and select commands to the electronic system. Input devices used with input device interface 1514 include, for example, alphanumeric keyboards and pointing devices (also called "cursor control devices"). Output device interface 1506 enables, for example, the display of images generated by electronic system 1500. Output devices used with output device interface 1506 include, for example, printers and display devices such as a liquid crystal display (LCD), a light emitting diode (LED) display, an organic light emitting diode (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 15, the bus 1508 also couples the electronic system 1500 to a network (not shown) through network interface 1516. In this manner, the computer can be a part of a network of computers (such as a local area network (LAN), a wide area network (WAN), or an intranet, or a network of networks, such as the Internet). Any or all components of the electronic system 1500 can be used in conjunction with the subject disclosure.

In some other aspects, the subject technology may be used in various markets, including, for example, and without limitation, sensor technology, signal processing and communication markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A method for communication, the method comprising:
   establishing, between a first platform and a second platform, a classical communication channel and a quantum communication channel;
   transmitting at an established rate, using the classical communication channel, a first encoded message and a decryption key from the first platform to the second platform; and
   while transmitting the first encoded message and the decryption key, transmitting at the established rate, using the quantum communicating channel, quantum key information from the first platform to the second platform, wherein the decryption key is configured to decode the first encoded message and the quantum key information is configured decode a second encoded message transmitted subsequent to the first encoded message.

2. The method of claim 1, further comprising prior to transmitting the quantum key information, scaling a transmission rate of the quantum key information to the established rate.

3. The method of claim 2, wherein scaling the transmission rate comprises:
   encoding the decryption key and the quantum key information on a plurality of spatial modes;
   combining the plurality of spatial modes into a single optical beam; and
   transmitting the single optical beam.

4. The method of claim 2, wherein scaling the transmission rate comprises:
   receiving an optical signal;
   splitting the optical signal into a plurality of optical signals; and
   transmitting the plurality of optical signals through a respective detector of a plurality of detectors, wherein a selected number of the plurality of detectors is based on the establish rate.

5. The method of claim 2, wherein scaling the transmission rate comprises:
   receiving a plurality of spectral modes at different wavelengths, the plurality of spectral modes representing the quantum key information;
   modulating the plurality of spectral modes to form a combined single optical beam; and
   transmitting the combined single optical beam.

6. The method of claim 1, wherein the established rate is at least 1 gigahertz.

7. The method of claim 1, wherein the established rate is at least 10 gigahertz.

8. The method of claim 1, further comprising discarding the decryption key after decoding the first encoded message.

9. A communication system comprising:
   a classical channel transmitter configured to transmit, at an established rate, classical information comprising a first encoded message and a decryption key;
   a quantum channel transmitter configured to generate a quantum information comprising quantum key information; and
   a transmitter subsystem configured to scale a transmission rate of the quantum information to the established rate, the transmitter subsystem comprising a multiplexer that encodes and combines the classical information and the quantum information, wherein the quantum key information is transmitted at the established rate and configured to decode a second encoded message transmitted subsequent to the first encoded message.

10. The communication system of claim 9, wherein the transmitter subsystem comprises:
    a plurality of vortex plates that converts the classical information and the quantum information into vortex modes; and
    a filter plate that combines the vortex modes into a single optical beam.

11. The communication system of claim 9, wherein the transmitter subsystem comprises:
    an optical pulse generator that converts the classical information and the quantum information into a plurality of pulses;
    a plurality of optical switches that receive the plurality of pulses; and
    a plurality of vortex plates that generates a sequence of pulses from the plurality of pulses, the sequence of pulses based on the plurality of optical switches, wherein the sequence of pulses is transmitted as a single optical beam.

12. The communication system of claim 9, wherein the transmitter subsystem comprises:
    a spectral mode generator that that converts the classical information and the quantum information into a plurality of wavelengths; and
    dispersion optics that combines the plurality of wavelengths into a single optical beam.

13. The communication system of claim 9, wherein the established rate is at least 1 Gigahertz.

14. The communication system of claim 9, wherein the established rate is at least 10 Gigahertz.

15. A communication system comprising:
    a classical channel receiver configured to receive, at an established rate, first classical information comprising a first encoded message and a first decryption key;
    a quantum channel receiver configured to receive a quantum information comprising a quantum key; and
    a receiver subsystem configured to:
      receive the quantum information and the first classical information at the established rate,
      decode, using a demultiplexer, to separate the first classical information from the quantum information,
      use the first decryption key to decode the first encoded message, and
      when second classical information is received, use the quantum key to construct a second decryption key configured to decode a second encoded message encoded in the second classical information.

16. The communication system of claim 15, wherein the receiver subsystem comprises:
- a filter plate that separates a single optical beam, provided by a transmitter, into a plurality of spatial modes; and
- a plurality of detectors that receives the plurality of spatial modes to determine the first classical information and the quantum information.

17. The communication system of claim 15, wherein the receiver subsystem is configured to receive, at the demultiplexer, a single optical beam and separate, using the demultiplexer, the single optical beam into a plurality of time-based pulses.

18. The communication system of claim 15, wherein the receiver subsystem comprises dispersion optics that receives a single optical beam and separates the single optical beam into a plurality of wavelengths to determine the first classical information and the quantum information.

19. The communication system of claim 15, wherein the established rate comprises at least 1 Gigahertz.

20. The communication system of claim 15, wherein the established rate comprises 10 Gigahertz.

* * * * *